United States Patent [19]

Hale et al.

[11] Patent Number: 4,869,102

[45] Date of Patent: Sep. 26, 1989

[54] METHOD AND APPARATUS FOR REMOTE MONITORING OF VALVES AND VALVE OPERATORS

[75] Inventors: Stanley N. Hale; Thomas Rak; Duane H. Rowicki, all of Cobb; Chin P. Ho, Fulton, all of Ga.

[73] Assignee: Movats Incorporated, Marietta, Ga.

[21] Appl. No.: 92,648

[22] Filed: Sep. 3, 1987

Related U.S. Application Data

[63] Continuation-in-part of Ser. No. 848,451, Apr. 4, 1986, Pat. No. 4,831,873.

[51] Int. Cl.⁴ .......................................... G10M 19/00
[52] U.S. Cl. ..................................... 73/168; 364/550
[58] Field of Search ................ 73/168, 862.27, 862.28, 73/862.31, 862.32; 137/551; 324/127, 142, 158 MG; 318/729; 251/129.11, 129.12; 364/550, 551

[56] References Cited

U.S. PATENT DOCUMENTS

| | | | |
|---|---|---|---|
| 4,029,122 | 6/1977 | Jaegtnes | 137/551 |
| 4,123,009 | 10/1978 | Kilpinen | 241/30 |
| 4,321,529 | 3/1982 | Simmonds et al. | 324/83 R |
| 4,333,118 | 6/1982 | Comstedt et al. | 361/30 |
| 4,542,649 | 9/1985 | Charbonneau et al. | 73/168 |
| 4,570,903 | 2/1986 | Crass | 251/129.12 |

FOREIGN PATENT DOCUMENTS 431464  7/1975  U.S.S.R. .................... 324/158 MG

OTHER PUBLICATIONS

Square D Company of Milwaukee, WI., Product Information Package Consisting of (a) Instruction Sheet for Class 8430 Type G Load Converter Relays, Nov. 83; (b) Bulletin M-629-Product Data-Sub.: Load Monitoring for Three Phase Induction Motors Using Class 8430 Type V Load Detector & Type G Converter, 1984; (c) Product News Control Products IC-2777, Class 8430, Nov. 1983.

Advertisement by Movats Incorporated entitled "Verifying Motor Operated Valve Operability from Motor Control Center", Jul. 1986.

Primary Examiner—William A. Cuchlinski, Jr.
Assistant Examiner—W. Morris Worth
Attorney, Agent, or Firm—Louis T. Isaf

[57] ABSTRACT

A method and apparatus for providing a previously unattainable yet desirable function of monitoring, at a remote location and/or in a remote (non-intrusive) manner, the condition of a valve operator to signal a need for more thorough inspection and for possible maintenance of the valve or valve operator; the method and apparatus including the relating of output power (motor load) of the valve operator motor to the valve operator stem load, setting up a threshold value for the power parameter based on a maximum allowable operator thrust depletion; and periodically monitoring actual power parameter values at a remote location for comparison to the threshold value.

29 Claims, 13 Drawing Sheets

ACTUAL ML VOLTAGE VS. TIME AND LOAD CELL VOLTAGE VS. TIME

ACTUAL LOAD CELL VOLTAGE VS. ACTUAL MOTOR LOAD VOLTAGE

LOAD CELL VOLTAGE VS MOTOR LOAD VOLTAGE: ACTUAL VS. CALCULATED

CALCULATED MOTOR LOAD SENSITIVITY APROACHING STEADY STATE

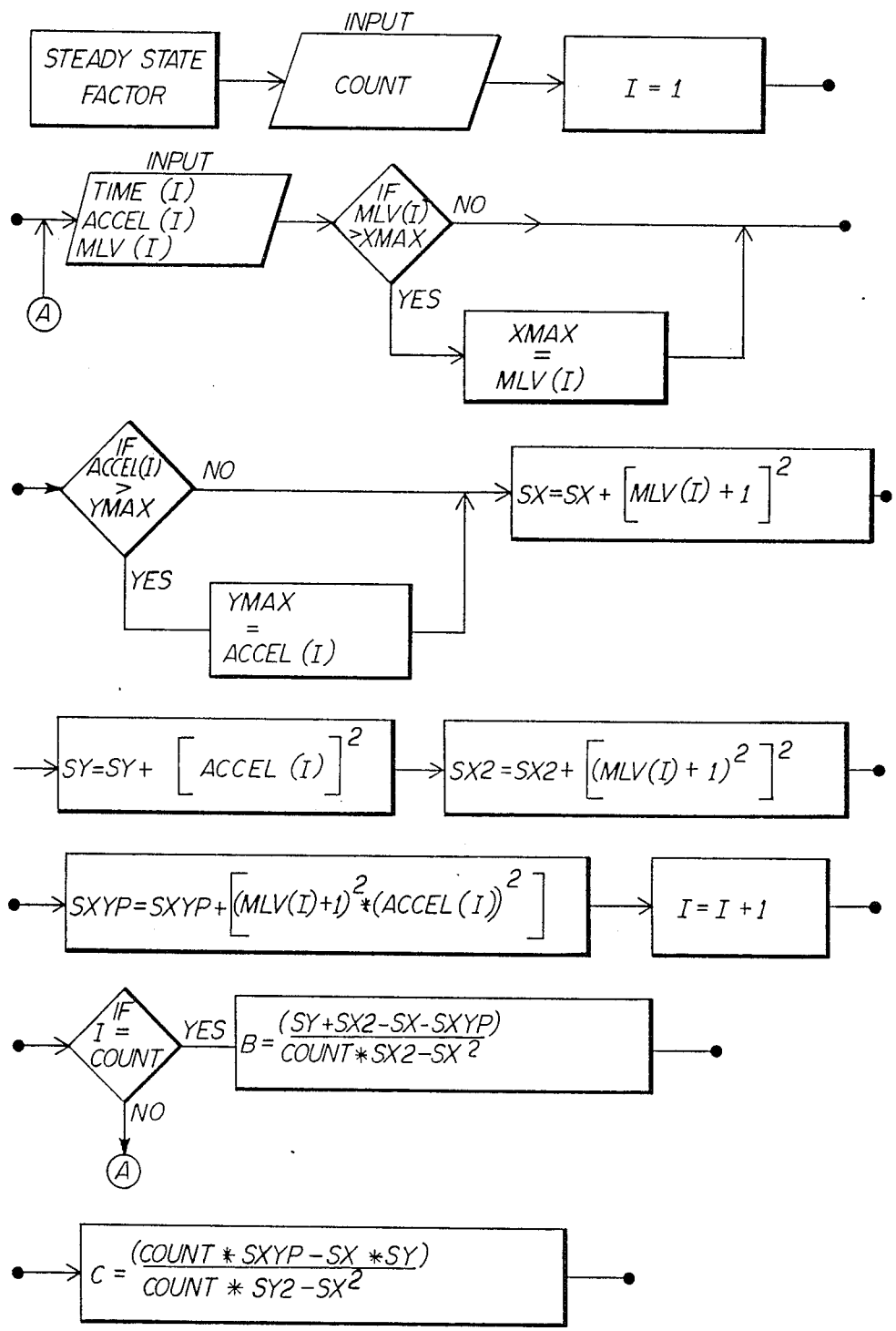
FIG 10 (PLATE 1 OF 4)

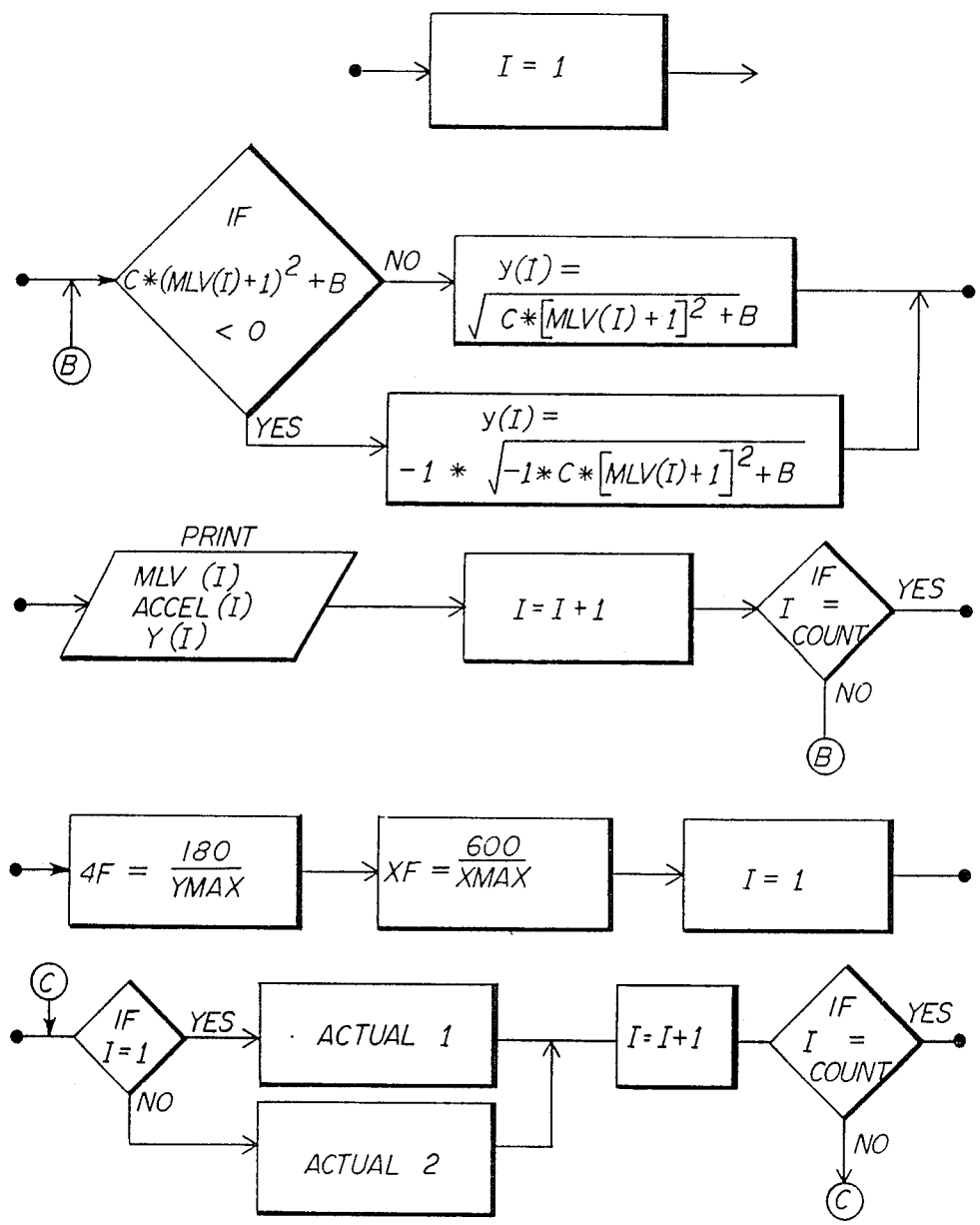
FIG 10 (PLATE 2 OF 4)

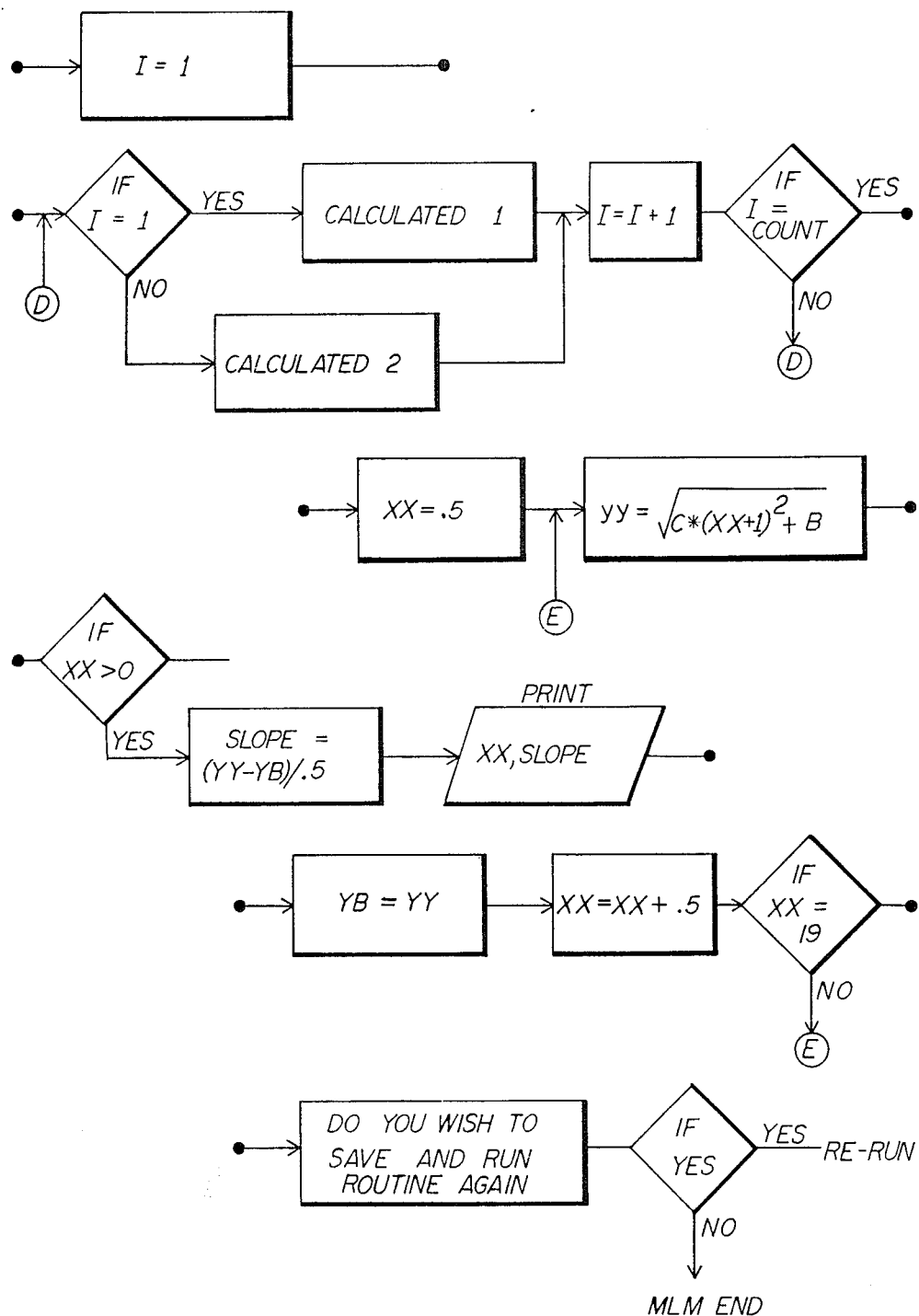
FIG 10 (PLATE 3 OF 4)

ACTUAL 1
    LINE (39+MLV(I)*XF, 180-ACCEL(I)*YF) —
       (39+MLV(I)*XF, 180-ACCEL(I)*YF)

ACTUAL 2
    LINE-(39+MLV(I)*XF, 180-ACCEL(I)*YF)

CALCULATED 1
    LINE (39+MLV(I)*XF, 180-Y(I)*YF) —
       (39+MLV(I)*XF, 180-Y(I)*YF)

CALCULATED 2
    LINE-(39+MLV(I)*XF, 180-Y(I)*YF)

MLV(I) = MOTOR LOAD VOLTAGE

ACCEL(I) = ACTUAL LOAD CELL VOLTAGE

Y(I) = CALCULATED LOAD CELL VOLTAGE

SLOPE = SENSITIVITY AS TIME INCREASED

I = SIMULATED VOLTAGE AS TIME INCREASED

FIG 10 (PLATE 4 OF 4)

METHOD AND APPARATUS FOR REMOTE MONITORING OF VALVES AND VALVE OPERATORS

The present application is a continuation-in-part of U.S. application Ser. No. 848,451, filed Apr. 4, 1986, now U.S. Pat. No. 4,831,873.

FIELD OF THE INVENTION

This invention relates generally to the field of testing and diagnosis of valve operators and, more specifically, to a method and apparatus for remotely testing the condition of a valve operator.

BACKGROUND OF THE INVENTION

Within the power industry, valves are operated remotely from open, closed and intermediate positions to improve or maintain utility power plant output, or in many cases to provide for the protection of the general public from release of radioactive materials either directly or indirectly. Continual, proper operation of these valves is essential to the well-being of the industry and the general public. The extreme emphasis on safety in nuclear power plants (and the presently bad reputation of the nuclear industry) has put a premium on the importance of maintaining proper operation of valves, of which there may be hundreds within a single plant.

At the forefront of industry attempts to monitor and maintain proper operation of these critical valves is the recent invention of Arthur G. Charbonneau, et al described in U.S. Pat. No. 4,542,649 (herein referred to as "649"). The 649 invention disclosed a new and important valve operator monitoring system to measure, record and correlate valve stem load, limit and torque switch positions, spring pack movement and motor current, providing time related information on valve performance. The information made available by the 649 patent provides a direct indication of developing valve and operator problems, such as excessive or inadequate packing load, excessive inertia, proximity to premature tripping, incorrectly set operating limit and torque switches, improperly functioning thermal overload devices, inadequate or excessive stem thrust loads, gear train wear, stem damage, and load relaxation.

Specifically, the "649" invention accomplishes monitoring of valve operator parameters by direct signal and equipment measurements taken at the location of the valve or valve operator. A user must venture to the location of the valve/valve operator and take direct measurements for monitoring purposes. More and more demand is being made by government and other agencies for a system which can monitor a valve condition from a remote, meaning distant, location, i.e. the power plant operation center or Master Control Center. Neither the "649" invention nor other known prior art provides a reliable system for accomplishing such remote monitoring.

Moreover, prior art valve monitoring is typically accomplished during no-flow conditions and requires at least minor, temporary modification of the valve operator. In nuclear power plants, if not also other facilities, testing equipment which is intrusive, meaning it in anyway modifies the valve operator or its circuitry, can not be left connected during valve-in-use conditions. Thus, typical prior art monitoring and testing is accomplished under no flow conditions with operation of the plant or valve sector closed down. Thus, a need exists for non-intrusive (and, thus, "remote") systems for monitoring the condition of the valve operator during actual valve-in-use conditions to signal the need for more extensive testing or maintenance of the valve or valve operator.

SUMMARY OF THE INVENTION

Briefly described, the present invention is unique in its discovery and utilization of a valve operator parameter measurable from a remote location, which discovered parameter is a reliable indicator of valve operator condition. The system of the present invention comprises (but is not limited to) method and apparatus: for simulating an operation impairing load on the valve operator; for measuring a power related parameter, such as motor load, which parameter is readily measured at the remote location; for correlating the power parameter and the operator stem load; for calibrating and establishing a threshold value of the power parameter, which threshold value is directly related to the operation impairing stem load; for periodically and remotely monitoring the power parameter during daily, in-use operation of the valve operator; and for generating and recording actual in-use values of the power parameter for comparison with the threshold value to signal an actual operation impairing condition at the valve operator.

The apparatus of the present invention includes devices for monitoring the valve operator thrust load and for non-intrusive monitoring of the motor load associated with the valve operator motor. The preferred embodiment of the apparatus further comprises a device for monitoring the position of limit switches and/or torque switches of the valve operator. Also included in the preferred embodiment are devices for recording values of parameters monitored by the aforementioned devices and for correlating and assisting in analysis of the recorded values.

It is an object of the present invention to provide a method and apparatus for monitoring the condition of a motor operated valve from a "remote", meaning removed in space, master control center of a power plant.

Another object of the present invention is to provide a method and apparatus for monitoring the condition of a valve, while the valve is in use, in a manner which is "remote", meaning it is non-intrusive.

Another object of the present invention is to provide a system (method and apparatus) which provides a remote observer of the valve with a manner for remotely determining if the thrust available within the valve operator to close/open the valve has been adversely reduced so as to render the valve in need of maintenance.

Yet another object of the present invention is to provide for the permanent storage of motor load signatures relating to a valve operator which can be analyzed and compared to thrust load signatures of the same operator for the purpose of relating a maximum allowable motor load to an adversely reduced thrust capability of the operator.

Other objects, features and advantages of the present invention will become apparent upon reading and understanding the specification when taken in conjunction with the accompanying drawings.

BRIEF DESCRIPTION OF THE DRAWINGS

FIG. 10 is a flow chart of a software program utilized in accordance with the present invention to acquire the calculated stem load vs motor load curve of FIG. 8 and the slope vs motor load curve of FIG. 9.

DETAILED DESCRIPTION OF THE PREFERRED EMBODIMENT

Figure 1:
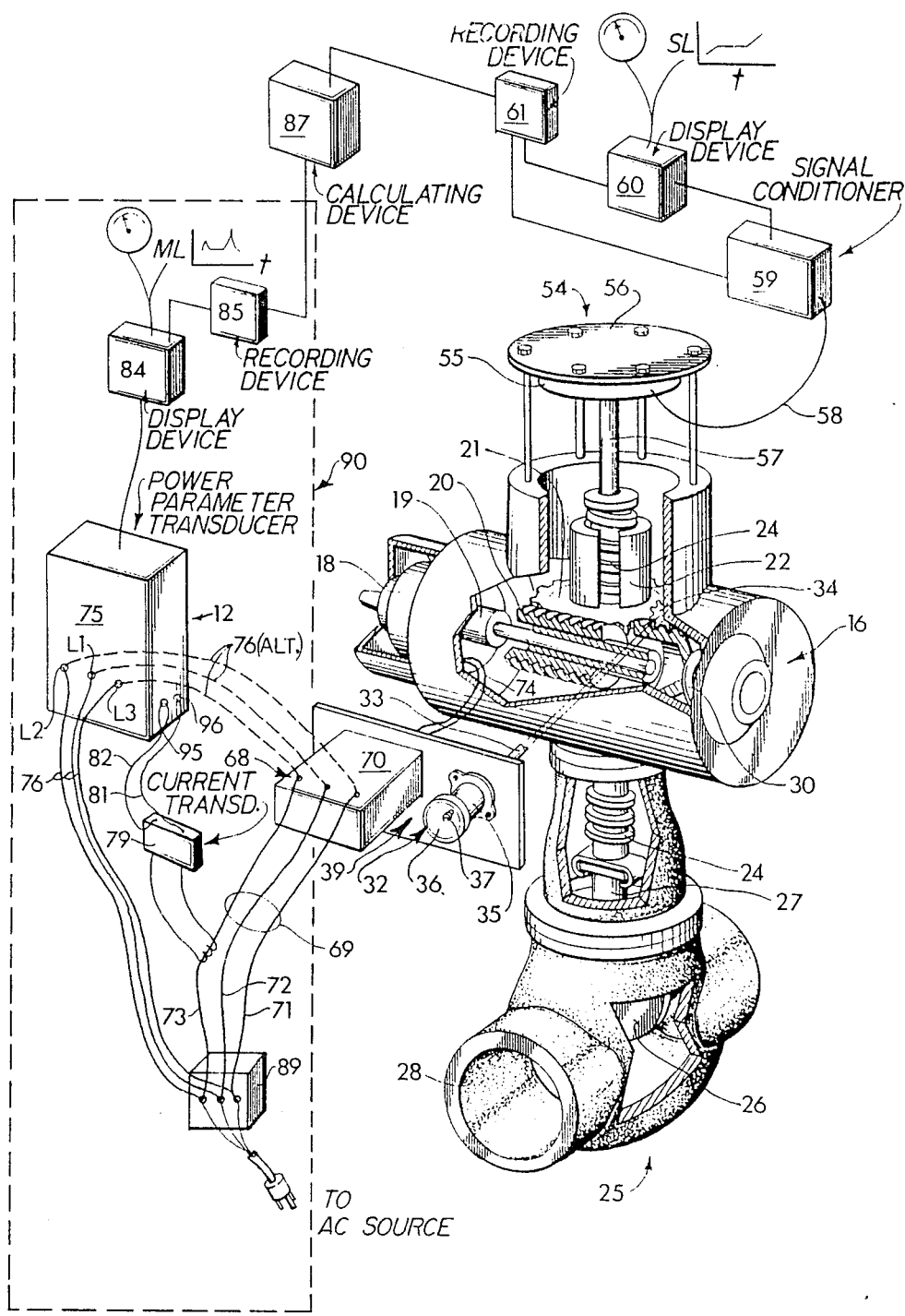
FIG. 1 is a pictorial representation, with parts broken away and parts isolated, of the Valve Operator Remote Monitoring System in accordance with the present invention, shown outfitted in the calibration mode.

Referring now to the drawings, in which like numerals represent like components throughout the several views, FIG. 1 shows the Valve Operator Remote Monitoring System 10 of the present invention outfitted for its calibration mode. A valve operator 16, of a type typically used in the art, is shown as having a motor 18 which drives a worm shaft 19, which in turn drives a worm 20, which in turn drives a worm gear 22. The worm gear 21 is formed with a drive sleeve 22 into which is inserted and to which is splined a drive nut (not seen). The internally threaded drive nut drives an externally threaded valve stem 24. The valve stem 24 engages valve shaft 27 to open or close the valve element 26 of the valve assembly 25. In order to absorb the rotating inertia of the motor 18 and other operator components, a cluster of compression springs or spring pack 30 is provided at one end of the worm shaft 19. A torque switch assembly 32 is seen as connected by a post 33 to a spur gear 34 for movement in relation to the worm 20. The torque switch assembly 32 is of a type typical in the industry and generally includes a switch chamber 35 which houses an electrical/mechanical torque switch (not seen), a face plate 36 and switch setting screw 37 at the face plate.

The valve assembly 25 which is operated on by the disclosed embodiment of the present invention is a gate valve of the type typically known in the industry. Gate valve assembly 25 includes a gate element 26 which is moved up and down perpendicular to the fluid flow through the piping 28.

The apparatus of the present invention comprises a load measuring device 54. In the embodiment of FIG. 1, the load measuring device 54 is shown as being in the form of a stem load measuring device as disclosed in the Charbonneau 649 Patent. U.S. Pat. No. 4,542,649 is, by this reference, made a part hereof, and operation of this stem load measuring device is as described therein. The stem load measuring device 54 comprises a load cell 55 mounted to the bottom of a blocking plate 56. Resting on top of the valve stem 24, in communication between the valve stem 24 and the lower surface of the load cell 54, is a valve stem extension 57. The output signal of the load cell 55 is directed by signal cable 58 to a signal conditioner 59 and then to a display Device 60 and/or recording device 61. The signal conditioner 59 provides a conditioned power supply for the load cell 55 and provides necessary sub-components for generating and delivering the output signal to a display device 60, such as an oscilloscope, meter or other such device 60.

Shown housed within the control box 39 of the operator 16 is a power terminal assembly 70. 3-phase power, typically 480 volts, is directed from an AC power source by cables 71, 72, 73 of motor input wiring 69 to the 3-phase power terminals 68. From the 3-phase power terminals, the power is directed to the motor 18 through the cable 74. The aforestated power connections are accomplished in a manner typically known in the industry. The three cables 71, 72, 73 are seen as eminating from master control terminals 89 located within the master control center 90 of the power plant. In this embodiment of FIG. 1, a power parameter transducer 75 is shown with input leads 76 connecting (i.e. by simple alligator clips) to each of the 3-phase master control terminals 89. The power parameter transducer 75 is also seen as connected by leads 78 to a current transducer 79. The current transducer 79 is clamped around one power cable 73 at the master control center 90. The power parameter transducer 75 of the preferred embodiment of this invention is a device which monitors the output power or output load (herein also called the "motor load") on the motor 18, and which computes the "real power" available in the motor 18 to produce torque within the valve operator 16. Whereas Power is computed using the formula $P = VI$, Real Power is computed using $P = VI \cos\phi$; and, in a three phase motor, Real Power is computed by $P = \sqrt{3} VI \cos\phi$; where V is input voltage to the motor 18, I is input current and $\phi$ is the power factor angle. Furthermore, the motor load transducer 75 of the preferred embodiment computes real input power to the motor and subtracts internal motor (efficiency) losses. Thus, output power or motor load monitored in accordance with the present invention is computed by $P = [\sqrt{3} VI \cos\phi - \text{efficiency losses}]$.

Figure 2:
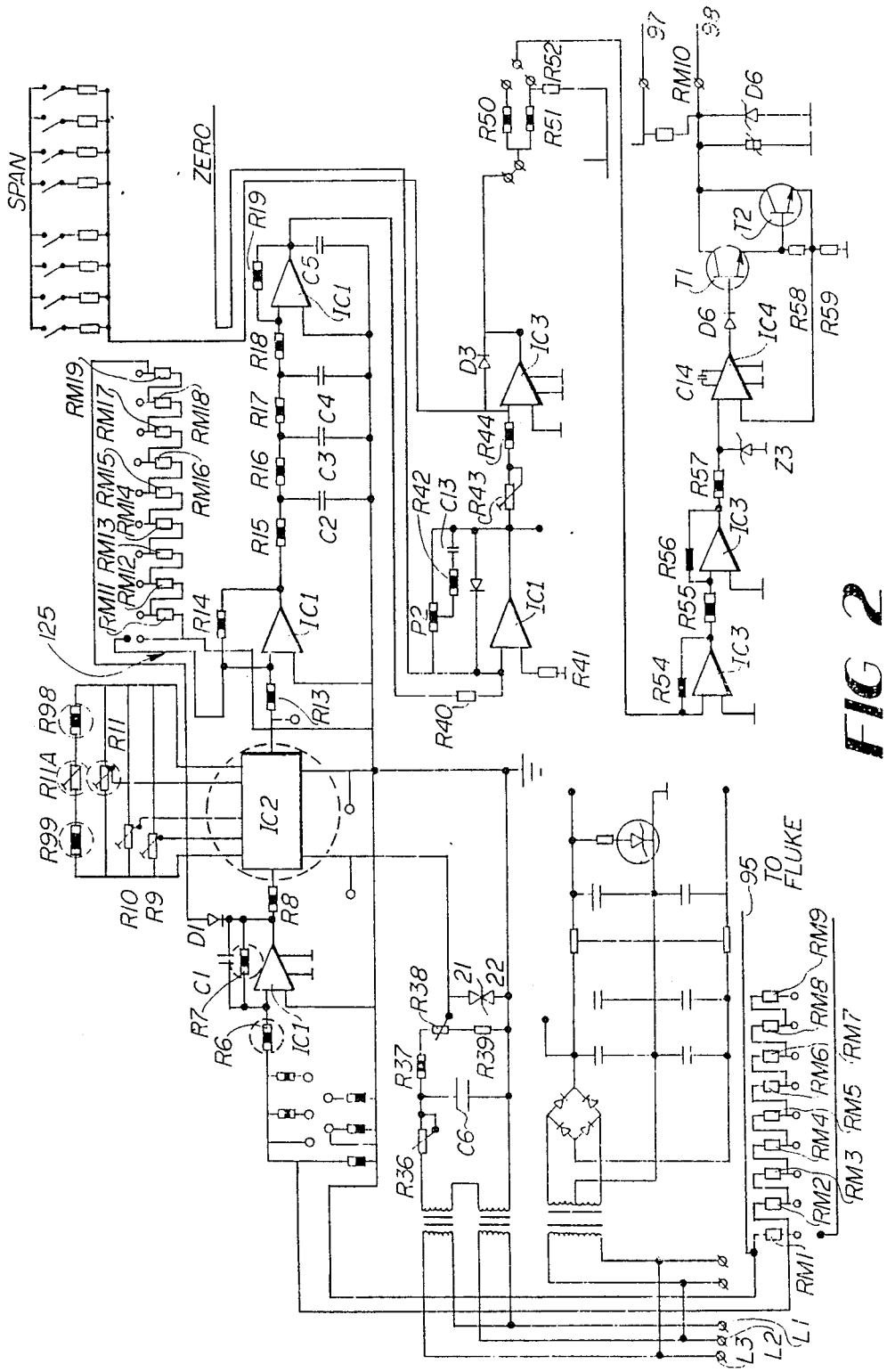
FIG. 2 is an electrical schematic of a motor load transducer of the valve operator remote monitoring system of FIG. 1

The motor load (output power) transducer 75 of the preferred embodiment is shown in schematic form in FIG. 2. The values of some, though not all of the components of one example of the preferred embodiment of the motor load transducer 75 are shown on the Schedule A, attached hereto and made a part hereof by this reference. Except for certain modifications, which are explained below, the motor load transducer 75 is a standard, off-the-shelf product. The specific transducer 75 utilized by the disclosed embodiment (FIG. 2), and modified as below, is that "CLASS 8430 TYPE G LOAD CONVERTER" sold as of July, 1987, by Square D Company of Milwaukee, Wis. The reader is directed to the manufacturer's information for a better understanding of aspects not explained herein. The reader is also directed to the specification of U.S. Pat. No. 4,333,118 which forms a basis for the concept of the operation of a motor load transducer 75. The Square D Load Converter, as actually manufactured, prior to modification in accordance with the present invention, is shown in FIG. 3.

Figure 3:
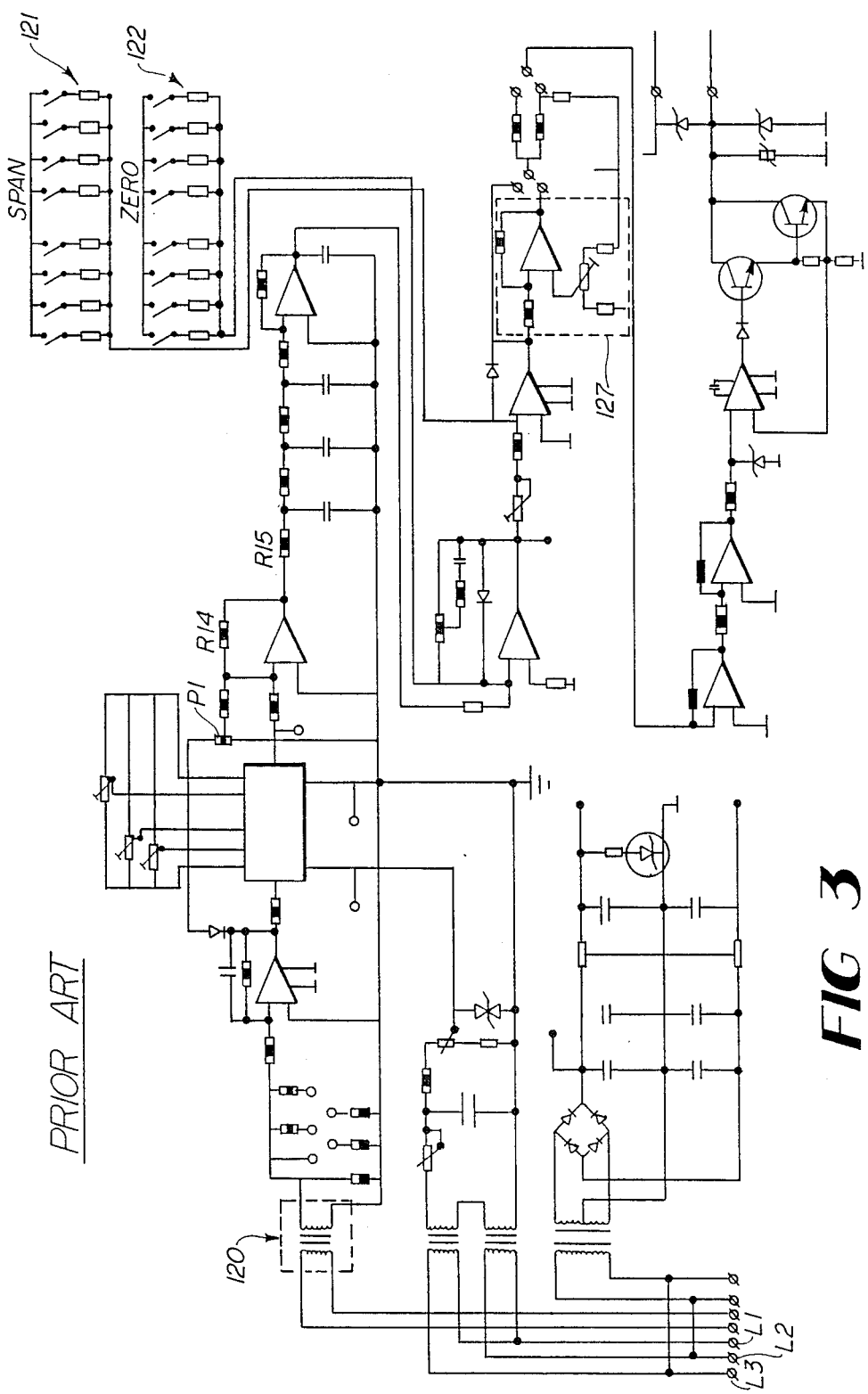
FIG. 3 is an electrical schematic of a prior art motor load transducer.

With reference to FIGS. 2 and 3, it is seen that the present invention has eliminated the toroid circuit 120 of the prior art device of FIG. 3. The present invention includes, where the toroid circuit 120 previously existed, a series of resistors RM1-RM9 (see FIG. 2) placed in parallel across the input leads 95, 96 from the current transducer 79. Variable combinations of the resistors RM1-RM9 are selectively placed within the current flow by switch 118 to vary voltage output to component IC1. A further modification is seen as an addition (see FIG. 2) by the present invention of a resistor RM10 across the current output terminals 97,98.

In accordance with the present invention, the setting of SPAN circuit 121 is determined by an equation derived for the present invention. SPAN is representative of the overall voltage gain of the transducer 75

$$\left(SPAN = \frac{Vin}{Vout}\right).$$

For any given motor 18, the SPAN setting is selected, in accordance with the present invention, by reference to the following equation, where the equation variables are taken from the motor name plate:

$$SPAN = \frac{(3)(IFLA)(P.f.)(eff)}{Max.\ AMP\ SCALE}$$

In accordance with the present invention, the "ZERO" circuit 122 of the prior device (See FIG. 3) is, preferably, set to a stationary value of zero (0). In accordance with the present invention, the multiplier chip IC2 has been chosen to accept voltages at its input pins 1 and 18 within a limited, defined range; that range, with respect to the specific example defined in this specification, being 130 mV to 700 mV. Also, potentiometer P1 of the prior device has been replaced by a combination switch 125 and plurality of resistors RM11-RM19; and the components of circuit portion 127 of the prior device (FIG. 3) have been eliminated.

The motor load transducer 75 is connected to the power input wiring 69 of the operator 16, either at the vicinity of the operator control box 39 or at the master control center 90, by connecting the non-reversing, voltage input lead L1 of the transducer75 (see FIG. 2) to the non-reversing phase cable 72 of the motor input wiring 69. The other two voltage input leads L2, L3 of the transducer are connected to the remaining motor input cables 71, 73. Connection is preferably made at the respective terminal block 73, 39 of the operator control box 39 or Master Control Center 90.

The current transducer 79, in accordance with the preferred embodiment of the present invention, is a voltage varying amp probe which generates an output signal of varying voltage in response to a varying current detected by the current transducer 79 in the motor input cable 69. An acceptable current transducer 79 performing the desired function in accordance with the present invention is that prior art devise known as FLUKE model Y8100; which current transducer 79 is installed with its current probe 80 clamped about the nonreversing phase cable 72 of the motor input wiring 69 and the output leads81, 82 connected to the current representing input leads 95, 96 of the motor load transducer 75; and which current transducer 79 is operated in accordance with manufacturer's instructions.

The output terminals 97, 98 of the motor load transducer 75, which provide a voltage signal representing the measured motor load, are connected to a display devise 84 and/or to a recording device 85.

Although the present invention is not to be limited hereby, the following are example specs of some of the more important system components:

the operator 16—Limitorque ® SMB 00.
Valve assembly 25—3" gate valve.
load cell 55—50,000 lb. rated load
operator motor 18—480 v, 3-phase 3 wire
power parameter transducer 75—Square D Company, Class 8430 Type G Load Converter (modified as above stated)
Current transducer 79—FLUKE model Y 8100
Signal conditioner 59—MOVATS 2100
Recording devices 61 and 85—NICOLET 3091
display devices 60 and 84—NICOLET 3091

Figure 4:
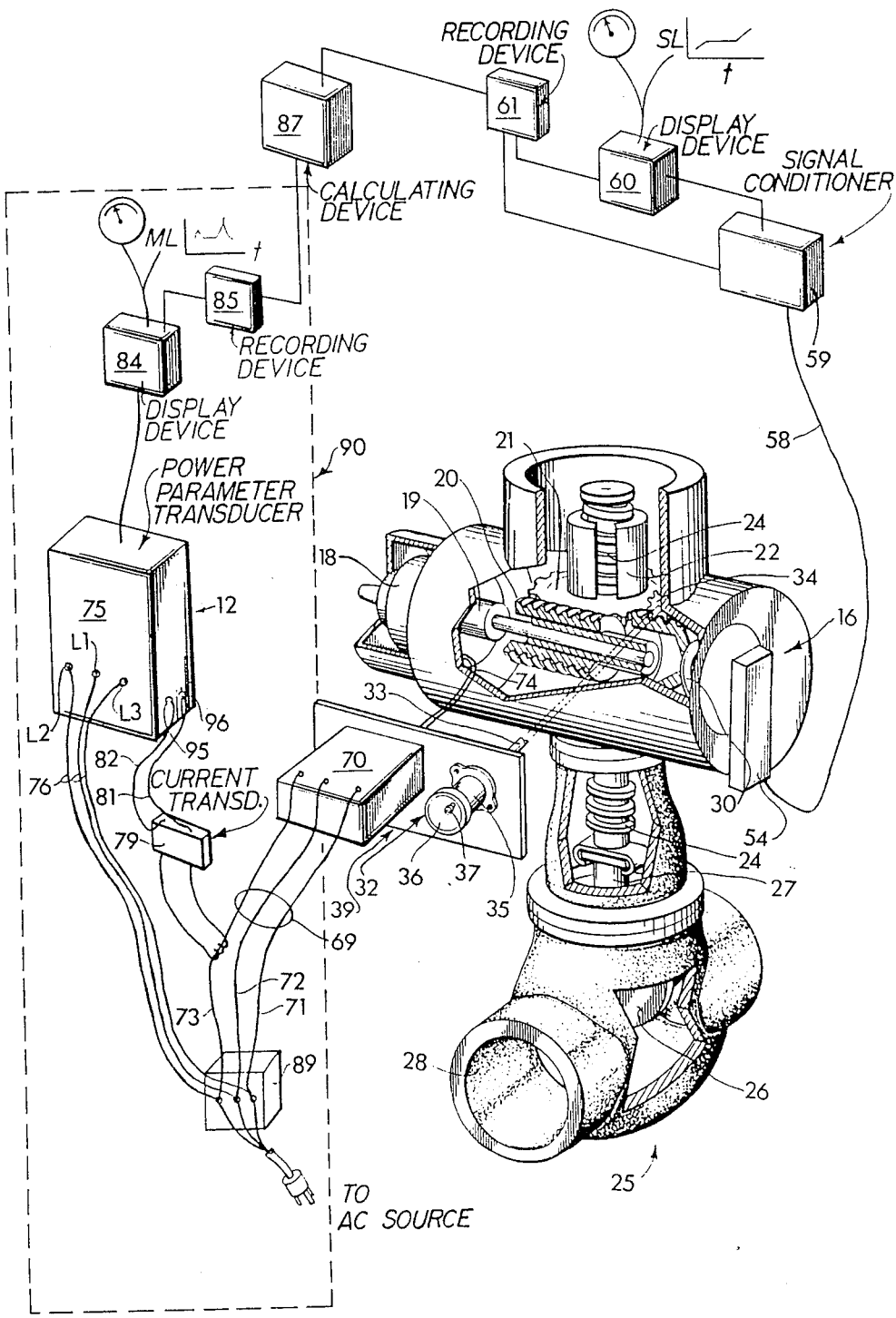
FIG. 4 is a pictorial representation, with parts broken away and parts isolated, of the Valve Operator Remote Monitoring System in accordance with the present invention, shown outfitted in the calibration mode, and showing an alternate embodiment to that of FIG. 1.

In alternate embodiments, the present invention is utilized in conjunction with the other parameter measuring devices of the Charbonneau U.S. Pat. No. 4,542,649, which has been incorporated herein by reference. Such embodiments of the present invention, in addition to other uses and advantages, provide a unique retrofit technique for calibrating valves in accordance with the present invention. The retrofit technique is utilized to calibrate valves for which stem load traces and spring pack movement traces have previously been acquired in accordance with the Charbonneau '649 invention, without the need to disrupt the operator 16 by mounting of the load measuring device 54. In this embodiment, the load measuring device 54 is replaced by the spring pack measuring device 54' of the Charbonneau '649 invention. This embodiment is shown in FIG. 4. Since, in accordance with Charbonneau '649, a calibration is made between the stem load and spring pack movement, the springpack movement device 54 is used, in accordance with the present invention, to acquire representative stem load values.

Operation

Figure 5:
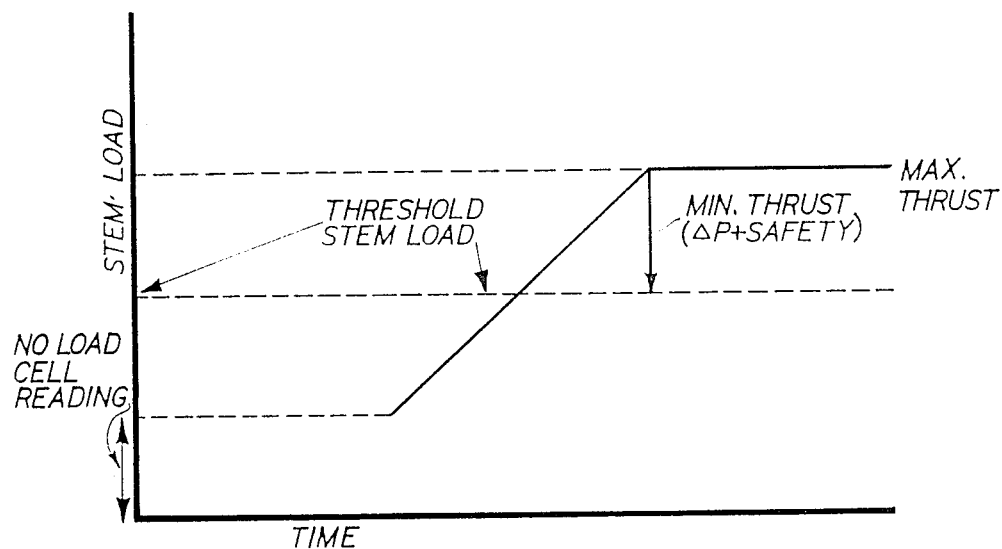
FIG. 5 is a sample stem load vs time curve.

Determining the operator output potential. It is understood that it is a main, though not sole, purpose of the present invention to ascertain the running output thrust of the valve operator and the availability to the operator of the "minimum thrust" (defined below). By following the below outlined procedures, the Valve Operator Remote Monitoring System 10 of the present invention can be utilized to monitor a valve operator 16 from a remote control center (i.e. master control center 90). The method of the present invention will assist the user in recognizing that a valve operator positioned in a remote location is jammed, over packed, damaged or otherwise malfunctioning. The determination of a valve malfunction condition in which the valve thrust available to the valve operator has reached an unacceptable low level. This unacceptable low level of available thrust is, for purposes of the present invention, defined as the "minimum thrust" which the user deems necessary for the valve operator 16 to properly open and close the valve 26. This minimum thrust value is typically calculated or otherwise determined by an engineer, power plant administrator, the user or other competent party. One method of determining the minimum thrust is to calculate the thrust required to overcome the maximum ΔP (pressure differential) of the valve and then increase that thrust by a margin of safety (i.e. 25%), using the resulting figure as the "minimum thrust". In accordance with the present invention, a "Threshold Value" of stem load is determined which represents the greatest load which the user will tolerate to build up within the operator prior to the time that the valve 26 has fully opened or fully closed. The relationship between maximum load (stem load at torque switch trip), minimum thrust (ΔP+safety margin) and threshold is shown on the sample stem load/time trace of FIG. 5. It is seen that, if the operator 16 Running Load (explained below) is in excess of the Threshold Value of stem load, the operator will not have available the determined "minimum thrust" to seat the valve 26.

The method of the present invention is generally performed as follows:

1. The user assures that the torque switch 32 setting of the operator 16 which is to be monitored is properly set. It is the purpose of the torque switch setting to automatically cut off the motor 18 when the valve operator torque (and, thus, stem load) has exceeded a predetermined maximum. The setting and verification of the torque switch setting and maximum stem load are accomplished, preferably, in accordance with the methods of the Charbonneau 649 patent.

2. The user determines the value of the "minimum thrust" and the Threshold Value of stem load, as discussed above.

Figure 6:
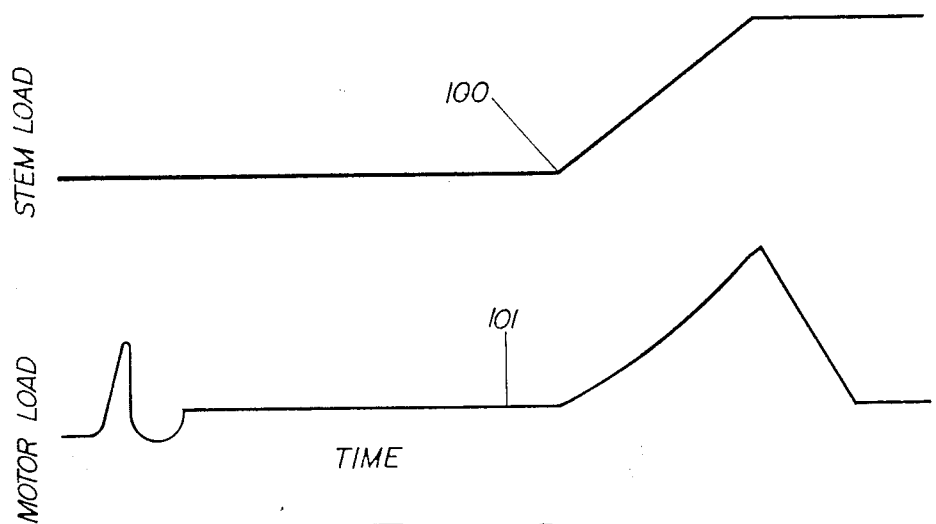
FIG. 6 is a graph displaying a stem load vs time curve and a motor load vs time curve generated in accordance with the present invention.
Figure 6A:
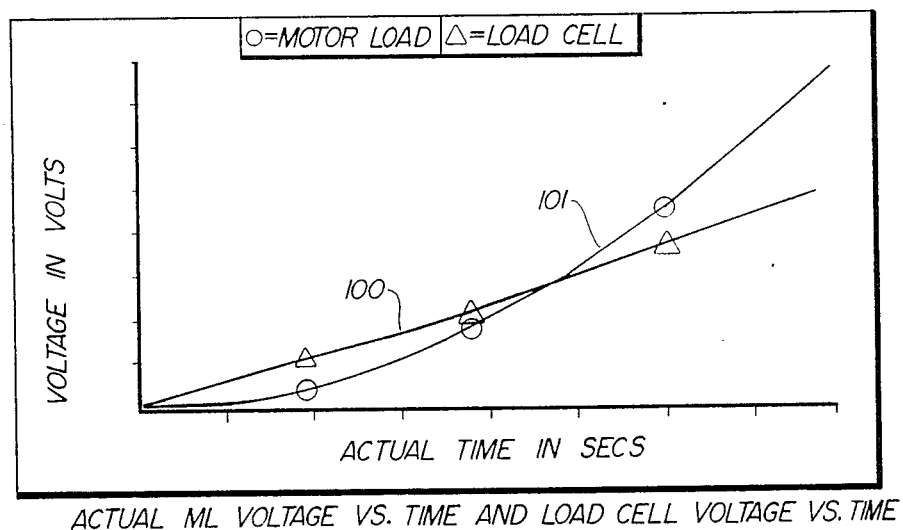
FIG. 6A is a graph displaying superimposed stem load/time and motor load/time curves of FIG. 6 generated during the Transient State in accordance with the present invention.

3. The valve operator is outfitted with the system apparatus of the present invention in the manner described above in relation to FIG. 1. With the system apparatus 10 outfitted as per FIG. 1, the system is in the calibration mode. Calibration of the remote monitoring system 10 of the present invention is accomplished as follows:

a. The valve operator motor 18 is turned on and the operator 16 is set to open the valve gate 26. With the operator in this open-valve mode, the driven valve stem 24 begins to move upward pushing against the valve stem extension 57 and into the load cell 55. Movement is blocked by the blocking plate 56.

b. Using the load cell 55 and plate 56 of the load measuring device 54, the user simulates a load on the valve stem 24. The simulated load is measured at the load cell 55. In the alternate embodiment of FIG. 4, measurement of the simulated load is accomplished through the use of a spring pack movement device 54' which operates in a manner described in the Charbonneau's 649 Patent; the specification of that patent having been incorporated herein by reference. The force signal generated at the load measuring device 54 (54') is conveyed to the signal conditioner 59. The output signal is read by the user at the display device 60 in the form of a meter reading or a generated trace such as a stem load/time trace and then, preferably, recorded at recorder 61. An example of a load/time trace representing the simulated load is shown as trace 100 in FIGS. 6 and 6A. The load which is simulated by the load cell 55 and blocking plate 56 is a rapidly increasing stem load which simulates seating of the valve or some other condition which imparts a rapid rise in load to the valve operator 16. In one example, the "simulated" load of the alternate embodiment of FIG. 4 is, actually, the load generated by seating of the valve. The imposition of this increasing, simulated stem load is typically halted by normal operation of the operator torque switch which trips to shut off the motor 18. For purposes of this disclosure, any such rapidly increasing load experienced by the operator, whether simulated or occurring during valve-in-use operation, is referred to as "Transient Load" and the period of duration of Transient Load is "Transient State". An example of a Transient State occurring during valve-in-use operation is the period of seating of the valve in the valve seat during the closing stroke; another example is the period of unseating of the valve from the valve seat during the opening stroke.

c. The power parameter transducer 75 is connected (or was previously connected) to the motor input wiring 69 and to the current transducer 79 as previously described. The setting of Switch 118 is chosen where the setting is a function of the motor's name plate Full Load Current ("IFLA") such that the output of the current transducer 79 can be reduced to a level compatable with the components of the motor load transducer 75. For example, for the specific example of motor load transducers 75 disclosed herein, the resistor RM1-RM9 values are chosen so that the input voltage to the motor load transducer 75 from current transducer 79 (after switch 118) remains in the range 130 mV to 700 mV when the motor 18 runs from no load to lock rotor. The output of the power parameter transducer 75 is provided, through display device 84, in the form of a meter reading, power parameter/time curve or other user observable manner and then, preferably, recorded at recorder 85. An example of a motor load/time trace taken in accordance with the present invention is seen as trace 101 in FIGS. 6 and 6A. In preferred application, the display devices 60, 84 and the recording devices 61, 85 are all in the form of a single multipurpose device, such as the recording oscilloscope known as the NICOLET 3091.

d. The load cell 55 measurements (resulting in the time trace 100 of FIGS. 6 and 6A) and the motor load measurements (resulting in the time trace 101 of FIGS. 6 and 6A) are taken and are related in the manner of "when stem load reads y, motor load reads x". This relationship of actual stem load measured at the load cell 55 to motor load readings provides directly usable data for ascertaining the stem load on the valve operator 16 during valve-in-use operation, for a given (measured) motor load, during a Transient State of the valve operator. More is discussed about this below.

Figure 7:
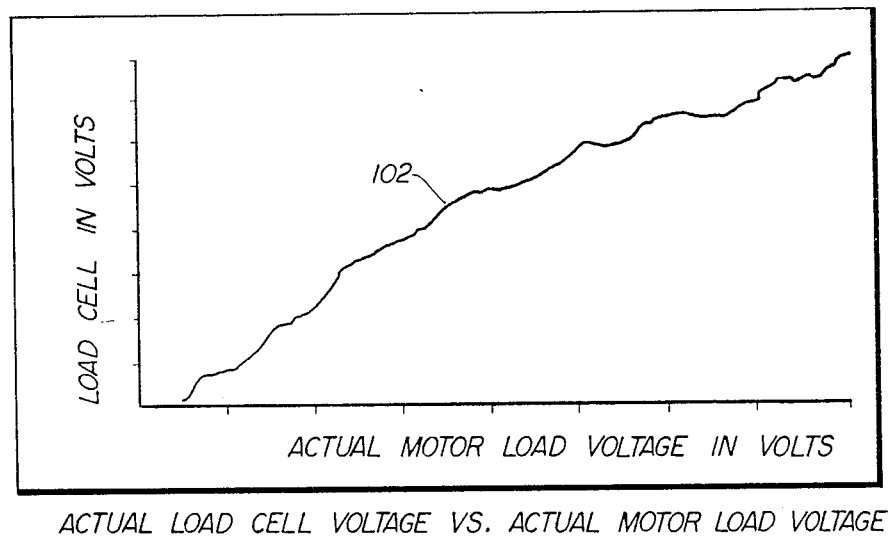
FIG. 7 is a graph displaying a curve plotting actual, measured stem load vs measured motor load, acquired in accordance with the present invention.
Figure 8:
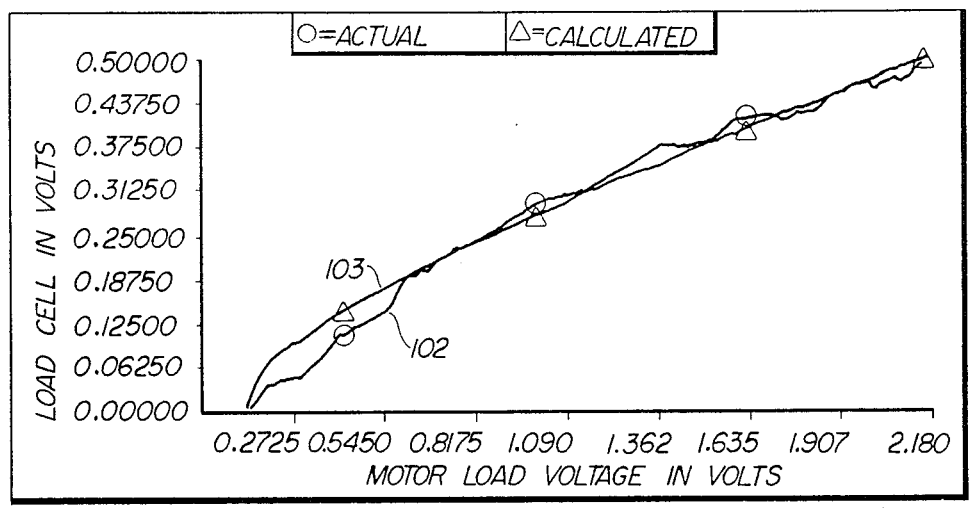
FIG. 8 is a graph displaying a curve plotting actual, measured stem load vs measured motor load and a curve plotting calculated stem load vs motor load, acquired in accordance with the present invention.
Figure 9:
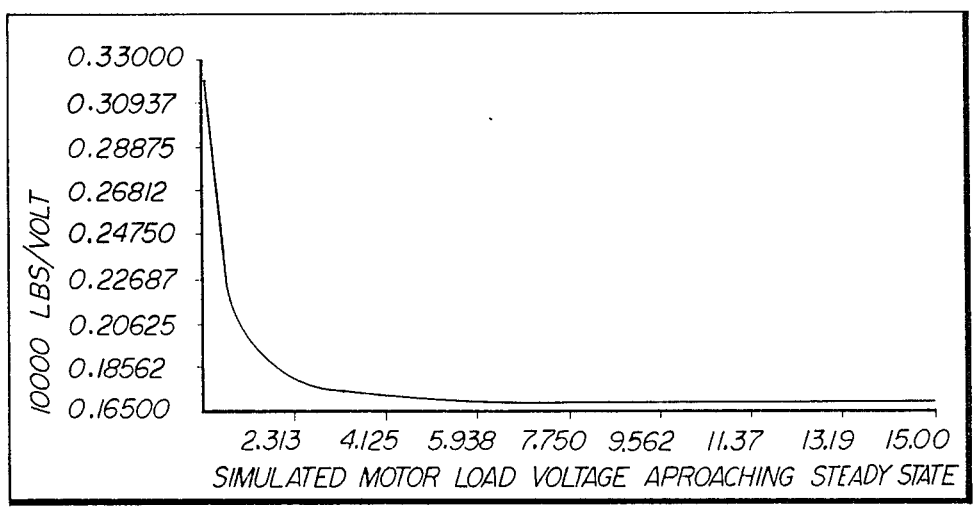
FIG. 9 is a curve plotting the slope of the calculated stem load vs motor load curve of FIG. 8 (y coordinate) vs motor load (x coordinate), as acquired in accordance with the present invention.

NOTE. It is noted that, in the herein discussed preferred embodiment, the actual (and only) stem load measurements are taken during a Transient State of the operator, during which the motor 18 is operating under high torque and high stress conditions. The output power (motor load) of a motor during a Transient State is not linearly related to the output power of the same motor during a period of constant work load or only gradually changing work load, such as the period of running load operation of the valve operator. "Running Load" is the stem load experienced by the valve operator 16 while moving the valve 26 from open-to-close, prior to the Transient State of valve seating; and also the stem load experienced while moving the valve from close-to-open, after the Transient State of valve unseating. For purpose of this disclosure, a period of duration of a Running Load is referred to as the "Steady State". (Refer to FIG. 12.)

e. Since there are only transient State measurements for stem load, Steady State values for Running Load are ascertained, in accordance with the present invention, as expressed hereafter. The x-y relationship of the motor load and stem load during the Transient State (i.e. "when motor load is x, stem load is y") is plotted to provide a resultant curve. An example of such curve of actually measured values is seen as curve 102 of FIG. 7 and FIG. 8. This curve (i.e. 102) of actually measured, Transient State values of motor load vs stem load is "fitted" to a curve represented by a hyperbolic equation, using known techniques of curve fitting (also known as linear regression). Although quickly and easily stated, the inventors have expended hours of experimentation, testing and analysis to: first, establish that the motor load vs stem load relationship can be represented by a curve that will tend to a steady, linear relationship; second, determine that the linear relationship derived by the fitted curve is, in fact, adequately representative of actual Steady State characteristics of the valve operator 16 (and motor 18); and, third, establish a hyperbolic equation which will consistently provide sufficiently adequate results. In accordance with the present invention, the equation established for the preferred embodiment is: $Y = SQRT[C(X+1)^2 + B]$; where "Y" represents a value of stem load and "X" represents a value of motor load, and where "C" is slope and where "B" is the Y-axis intercept. One example of a calculated curve, calculated from the equation, is curve 103 shown in FIG. 8, and is potted with the actual curve 102, generated from the actual measurements taken during calibration steps 3a–3d above, in accordance with the present invention. The second derivative of the preferred equation is shown, as one example, plotted in FIG. 9 versus the motor load, and indicates that the slope of the curve 103 tends to a linear relationship of motor load to stem load. This is interpreted, in accordance with the invention, as indicating a tendency to a linear relationship as the motor 18 reaches a Steady State condition. Thus the Steady State period of Running Load in the valve operator 16 (and motor 18) is represented by a region of steady slope (not seen) of the calculated curve 103. Steady state is represented by the approximately straight line region of the curve of FIG. 9. The value of this steady slope is referred to, for purposes of this invention, as the "Steady State Factor" and is in the ratio of stem load divided by motor load. For example, in the sample curve of FIG. 9, the Steady State Factor is approximately 0.165 units of stem load to 1 unit of motor load. FIGS. 8 and 9 are provided with voltage values purely for purposes of an example which shows relationship of the scales.

f. The Steady State Factor is separately determined for each valve operator 16 (and motor 18) as result of the above calibration steps. Since the preferred hyperbolic equation is established, the Steady State Factor is determined by: plugging into the equation the actual measured values of stem load taken at the load cell 55 (as the "y" values) and actual measured values of motor load taken at the motor load transducer 75 (as the "x" values); solving for the constants ("B" and "C"); and calculating the slope of the curve as it approaches the "Steady State". In the preferred embodiment, determination of the Steady State Factor is accomplished by a calculating device 87, such as a computer operating under a calculation program. An example of an appropriate flow chart for one such calculation program is shown in FIG. 10.

The following is a "verbal walkthrough" of the flow charts of FIG. 10, beginning at the top left of Plate 1 of 4 and progressing, line-by line, through Plate 3 of 4. Plate 4 of 4 contains some appropriate functions and definitions related to the flow chart. The Count is read in and I is set equal to 1. I is used as a count register to keep track of the number of times the program goes through a particular loop. "COUNT" is the total number of data points taken as "actual data" during the calibration steps 3a–3b. TIME(I), ACCEL(I), and MLV(I) are arrays. Each one is a bank of data that was obtained through testing.

MLV(I) is an array tat stores the different motor load voltages. The particular value in the array that is selected is determined by I.

ACCEL(I) is an array of the actual load cell voltage.

Y(I) is an array where the calculated load cell voltages are stored.

slope is the sensitivity as time increases.

TIME(I) is an array of the time values.

XMAS, YMAX, SX, SY, SX2, SXYP, B, C, YF, XX, YY, and YB are all variables that are used for ease of calculating other variables. Preferably, as would be the practice of one skilled in the art, the variables are preset to "0" at program initialization.

(A) A value is read in for TIME, ACCEL, and MLV. MLV is compared to XMAX and XMAX is set equal to MLV if MLV is greater than XMAX. ACCEL is compared to YMAX and YMAX is set equal to ACCEL if ACCEL is greater than YMAX. Values for SX, SY, SX2, and SXYP are determined by their respective equations shown on Plate 1. I is then incremented by 1 and compared to Count. If I is not equal to Count then the program goes back to point A. If I is equal to Count then the values for B and C are determined by their respective equations shown on Plate 1. I is set equal to 1.

(B)
Is $(C * (MLV(I)+1)^2 + B$ less than 0)?
NO, then $Y(I) = SQRT (C * [MLV(I)+1]^2 - B)$.
YES, then $Y(I) = -1 * SQRT(-1 *C *[MLV(I)+1[^2 + B)$.

The values for MLV(I), ACCEL(I), and Y(I) are printed. I is incremented by 1 and compared to Count. If I is not equal to Count, the program goes back to point B. If I is equal to count then XF and YF are determined by their respective equations shown on plate 2. (XF and YF are only tangentially related to the function of the program, since they are used to establish the relative size of the display for the subsequent graphs.) I is then set equal to 1.

(C) If I=1 then a starting point is given for a graph based on ACTUAL 1. After the first time, I will not be equal to 1 so the program draws a line from point to point based on ACTUAL 2. That is, it draws a line from the previous point determined by ACTUAL 2 (or ACTUAL 1) to the current point determined by ACTUAL 2. It draws this graph as long as I is not equal to Count. When I is equal to Count then I is reset to 1.

(D) If I is equal to 1 then a starting point is given for a graph based on CALCULATED 1. After that I will not be equal to 1 so the program draws a line from point to point based on CALCULATED 2. It does this the same as in part C. It draws this graph as long as I is not equal to Count. When I is equal to Count then XX is set equal to 0.5.

(E) For XX=0.5 to 19:
YY=SQRT(C * (XX+1)$^2$+B);
slope=(YY −YB)/0.5);
Print XX and slope;
Set YB=YY;
Increment XX by 0.5;
Is I=19?
NO, then go back to point E.
YES, then do you wish to save and run routine again?
Yes, then ReRun.
No, then EXIT.

It can be seen that the general function of the program is: (at subroutine A), to solve for the constants "B" and "C"; (at subroutine B) to calculate "calculated" values of stem load from the preferred hyperbolic equation; (at subroutine C), to draw the curve of actual stem load vs motor load data, as in, for example, the curve of FIG. 7 and curve 102 of FIG. 8; (at subroutine D) to draw the curve of calculated stem load vs motor load, as in, for example, curve 103 of FIG. 8; and (at subroutine E), to calculate the slope of the curve of the preferred hyperbolic equation as define by the determined constants "B" and "C" and at arbitrary incremental changes of 0.5 in the motorload ("XX" values of the preferred hyperbolic equation). The slope is calculated at the gradually (incrementally) increasing values of XX, thus representing the slope of the curve as it approaches "Steady State". The "Steady State Factor" will be recognized as the approximately constant slope identified as values of XX increase.

It will be noted that subroutines (B), (C) and (D) of the flow chart of FIG. 10 are not necessary to determination of the "Steady State Factor"; but they represent a portion of the calculation program assisting in the drawing of curves helpful in visually perceiving actual and calculated data in accordance with the preferred embodiment of the present invention.

4. Through the above described calibration steps, the user has now determined a Steady State Factor for the respective valve operator 16, in accordance with the present invention. From this point on, the Motor Load for the respective valve operator has been correlated to the stem load and the stem load can now be deduced from measurements taken only of the motor load. Knowing the Steady State Factor, a Threshold Value for motor load is calculated by dividing the Threshold Value for thrust load (see FIG. 5) by the Steady State Factor. Or, conversely, the stem load and thus the thrust generated by the operator 16 is deduced from measurements of motor load by multiplying the motor load by the Steady State Factor.

Figure 11:
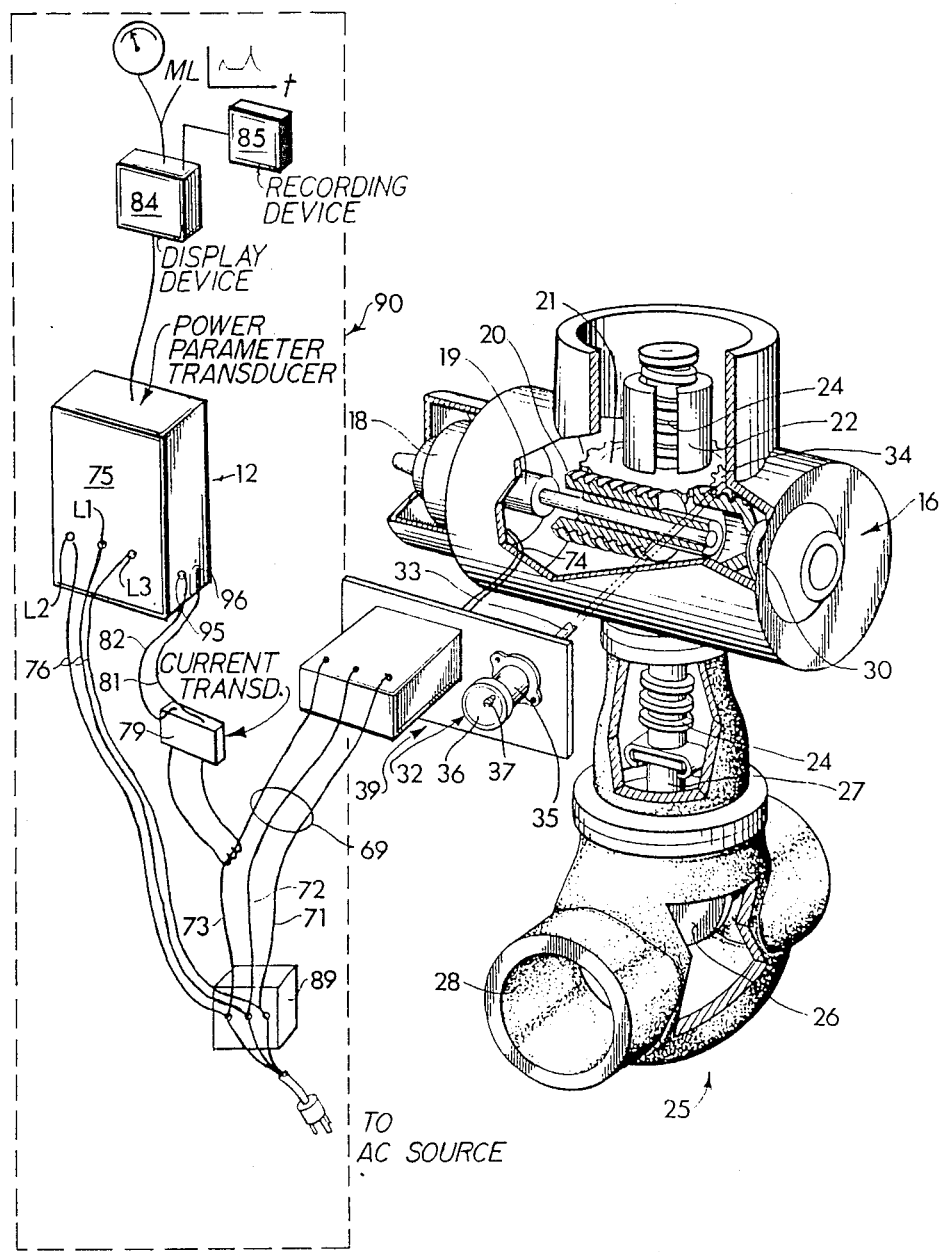
FIG. 11 is a pictorial representation of the Valve Operator Remote Monitoring System of FIG. 1, shown in the valve-in-use monitoring mode.

5. The valve operator 16 is returned to service by removal of the load measuring device 54 and/or spring pack movement monitoring device 54'. The system apparatus 10 of the present invention is now no longer in the calibration mode (see FIGS. 1 and 4) but is now in the monitoring mode (see FIG. 11). In the monitoring mode, in accordance with the present invention, the power parameter transducer 75 remains connected, preferably at the Master Control Center 90 in the non-intrusive manner discussed above, to the power terminals 89 (or 68). The output from the power parameter transducer 75 is conveyed by appropriate signal conveying cable to the display device 84, i.e. meter or oscilloscope.

Figure 12:
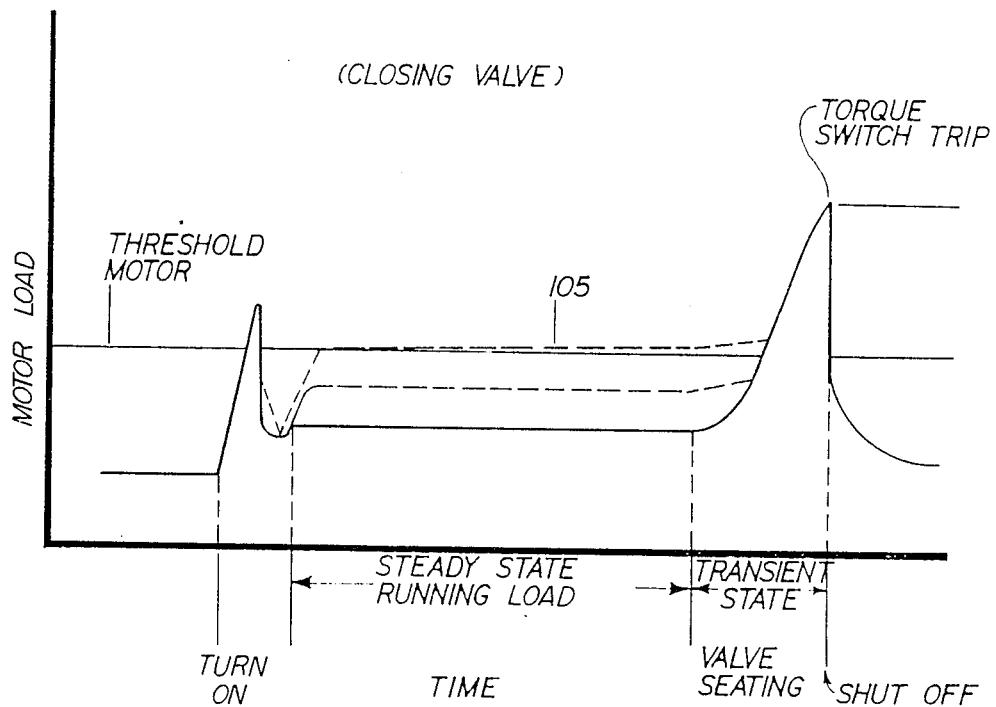
FIG. 12 is a graph representing a plurality of motor load verses time curves generated during valve-in-use operation, in accordance with the present invention.

6. The user monitors the motor load on a periodic basis at the master control center 90 or, in certain embodiments, at the valve operator 16. FIG. 12 shows examples of a plurality of motor load traces acquired during valve-in-use operation of the valve operator 16 and valve 26, taken during monitoring.

7. When and if the actual value of the monitored motor load is observed to equal or exceed the Threshold Value for motorload (see trace 105 of FIG. 12), the user is alerted, either by mental association or by a physical alarm, that there is a possibility that the thrust now available to the operator is insufficient to successfully open or close the valve gate 26. At this point, the user should know to investigate the valve to determine if there is, indeed, a condition which requires repair, maintenance or replacement of the valve. Although a physical alarm is not a required component of the present invention, alternate embodiments of the invention include a buzzer alarm or other audible signal. In preferred embodiments, the recording device 85 located at the remote master control center 90 is a device which provides a printed, time related record of the monitored motor load to allow for scanning by the user of the motor load condition over a period of time.

Whereas the preferred embodiment is disclosed with reference to measuring of loads on the stem 24 using a load measuring device 54, this invention is not limited to the relationship of motor load to operator thrust measured as stem load. Rather, this invention, is specifically intended to utilize output power (motor load) of an operator motor 18 as an indicator of mechanical output potential of the operator. It is understood that the invention includes alternate embodiments in which a mechanical output (and thus mechanical output potential) such as output torque and/or rotational force (for example, at the drive sleeve 22 or worm gear 21) is measured and related to motor load. In such embodiments, an appropriate torque measuring device replaces the stem load measuring device 54. Furthermore, adoption of the torque measuring embodiment finds application in monitoring output potential of quarter-turn actuators. An example of an appropriate torque measuring device is that device disclosed in U.S. patent application Ser. No. 850,761 filed Apr. 11, 1986, the specification of which is hereby incorporated herein by reference and a copy of which is attached hereto and incorporated herein by reference. Other devices for measuring torque and/or rotational force in a valve operator are known in the existing art.

Whereas this invention has been described in detail with particular reference to preferred embodiments thereof, it would be understood that variations and modifications can be effected within the spirit and scope of the invention, as described herein before and as defined in the appended claims.

We claim:

1. Method of monitoring the condition of a valve and/or valve operator in a motor operated valve system including a motor driven operator driving a valve stem to open and close a valve, said method comprising the steps of:

developing a load on the valve stem, during a calibration period;
measuring the stem load developed on the valve stem during the calibration period;
simultaneously with the measuring of the stem load during the calibration period, measuring the motor load of the operator motor;
correlating the motor load to the stem load.,
subsequently measuring motor load during valve-in-use operation of the valve by the valve operator;
deducing the stem load, during valve-in-use, from the measured motor load.

2. Method of claim 1, wherein the correlating step comprises the step of recording corresponding values of measured stem load and measured motor load; and wherein the step of deducing the stem load comprises the steps of comparing the motor load during valve-in-use to the motor load during the calibration period, and choosing the valve-in-use stem load as the recorded stem load corresponding to the compared motor load.

3. Method of claim 1, wherein:
the correlating step comprises the steps of deriving a curve definable by polynomial equation and representative of the relationship between motor load and stem load, and ascertaining a steady state condition of generally linear relationship between motor load and stem load on the derived curve, and determining a steady state factor representative of the slope of the derived curve during the steady state condition; and
the step of deducing stem load during valve-in-use comprises the step of multiplying the motor load measured during valve-in-use by the steady state factor.

4. Method of claim 3, wherein the step of deriving a curve comprises the step of deriving a curve representative of the relationship between motor load and stem load derived from the motor load and stem load measurements taken during the calibration period.

5. Method of claim 4, wherein the curve deriving step comprises the step of deriving a curve definable by the equation: $Y=\text{SQRT}[C(X+1)^2+B]$, where C is slope and B is the Y-axis intercept, and Y represents stem load and X represents motor load.

6. Method for monitoring the condition of a valve and/or valve operator to signal a need for maintenance of the valve or valve operator, said method comprising the steps of:
imposing a mechanical load on the valve operator;
measuring a mechanical output of the valve operator in response to the imposed mechanical load;
measuring the motor load of the valve operator motor during imposition of the mechanical load;
placing the valve and valve operator in use;
measuring the motor load of the valve operator during valve-in-use generation of mechanical load on the valve operator; and
relating the motor load measured during valve-in-use with the motor load measured during imposition of the load to provide an indication of mechanical output potential in the valve operator during valve-in-use.

7. Method of claim 6, wherein the step of imposing a mechanical load on the valve operator comprises the steps of:
engaging the valve stem of the valve operator; and
resisting movement of the valve stem.

8. Method of claim 6, wherein the step of measuring the motor load during valve in use is accomplished at a terminal located at a location removed in space from said valve operator.

9. Method of claim 6, wherein the relating step comprises the steps of recording corresponding values of measured mechanical output and measured motor load., comparing the motor load during valve-in-use to the motor load during imposition of the mechanical load, and choosing the valve-in-use mechanical output as the recorded mechanical output corresponding tn the compared motor load.

10. Method of claim 6, wherein the relating step comprises the steps of deriving a curve definable by a hyperbolic equation and representative of the relationship between motor load and mechanical output and ascertaining a steady state condition of generally linear relationship between motor load and mechanical output on the derived curve, and determining a steady state factor representative of the slope of the derived curve during the steady state condition.

11. Method of claim 10, wherein the step of deriving a curve comprises the step of deriving a curve definable by the equation: $Y=\text{SQRt}[C(X+1)^2+B]$, where C is slope and B is the Y-axis intercept, and Y represents mechanical output and X represents motor load.

12. Method of claim 6, wherein said step of measuring a mechanical output includes the step of measuring the output thrust of the operator at the valve stem in response to the imposed mechanical load.

13. Method of claim 6, wherein said step of measuring a mechanical output includes the step of measuring rotational forces of the operator, generated in response to the imposed mechanical load.

14. Method for monitoring the condition of a valve and/or valve operator to signal a need for maintenance of the valve or valve operator, which operator drives a valve stem to operate the valve said method comprising the steps of:
initially resisting movement of the valve stem to define a transient condition of continually increasing mechanical load imposed in the valve operator;
measuring the mechanical load imposed in the valve operator during the imposed transient condition;
measuring motor load of the valve operator during the imposed transient condition;
correlating the measured mechanical load with the measured motor load;
removing initial resistance to movement of the valve stem;
placing the valve and valve operator in use;
measuring the motor load of the valve operator during valve-in-use generation of mechanical load in the valve operator;
relating the motor load measured during valve-in-use with the correlated mechanical load and motor load to provide an indication of mechanical load developing in the operator during valve-in-use.

15. Method of claim 14, wherein:
the correlating step comprises the step of recording corresponding values of measured stem load and measured motor load; and
the relating step comprises the steps of comparing the motor load during valve-in-use to the motor load during the imposed transient condition, and choosing the valve-in-use mechanical load as the recorded mechanical load corresponding to the compared motor load.

16. Method of claim 14, wherein:
the correlating step comprises the steps of deriving a curve definable by a hyperbolic equation and representative of the relationship between motor load and mechanical load, and ascertaining a steady state condition of generally linear relationship between motor load and mechanical load on the derived curve, and determining a steady state factor representative of the slope of the derived curve being the steady state condition, and
the relating step comprises the step of multiplying the motor load measured during valve in use by the steady state factor.

17. Method of claim 16, wherein the step of deriving a curve comprises the step of deriving a curve definabale by the equation: $Y = \text{SQRT}[C(X+1)^2 + B]$, where C is slope, B is the Y-axis intercept, and Y represents mechanical load and X represents motor load.

18. Method of claim 14, wherein said step of measuring a mechanical load includes the step of measuring the output thrust of the operator at the valve stem in response to the imposed mechanical load.

19. Method of claim 14, wherein said step of measuring a mechanical load includes the step of measuring rotational forces of the operator generated in response to the imposed mechanical load.

20. Apparatus for monitoring the condition of a valve and/or valve operator in a motor operated valve system including a motor driven operator driving a valve stem to open and close a valve, said apparatus comprising:
means for imposing a mechanical load on the valve operator;
means for measuring a mechanical output of the valve operator in response to imposition of mechanical load; and
means for measuring the motor load of the valve operator both during imposition of mechanical load and during valve-in-use generation of mechanical load on the valve operator; and
steady state determining means for determining a steady state factor from said measured mechanical output and said motor load measured during imposition of said mechanical load, said steady state factor being representative of a generally linear relationship between motor load and mechanical output of the valve operator,
whereby the multiplication product of the steady state factor and measured valve-in-use motor load provides a value of value-in-stem load representative of the general condition of the valve and/or valve operator.

21. Apparatus of claim 20, wherein said steady state determining means comprises:
curve deriving means for deriving the constants of a curve defining equation representing the relationship between motor load and operator mechanical output; and
slope determining means for ascertaining a steady state condition of generally linear relationship between motor load and mechanical output and for determining the slope of the motor load and mechanical output relationship during the steady state condition, said slope during steady state condition being said steady state factor.

22. Apparatus of claim 20, further comprising display means for displaying a time related trace of measured motor load.

23. Apparatus of claim 20, further comprising:
recording means for recording measured values of motor load.

24. Apparatus of claim 20, further comprising:
converting means for converting a value of motor load measured during valve-in-use to a corresponding value of operator mechanical output.

25. Apparatus of claim 24, wherein said converting means comprises:
transient converting means for converting a value of motor load to a value of mechanical output during a transient period of increasing motor load, including means for comparing motor load during valve-in-use to motor load during imposition of mechanical load, wherein said corresponding value of operator mechanical output is that mechanical output actually measured during imposition of mechanical load; and
steady state converting means for converting a value of motor load to a value of mechanical output during a steady state period, wherein said corresponding operator mechanical output is the product of measured motor load and said steady state factor.

26. Apparatus of claim 20, wherein said means imposing mechanical load comprises blocking means selectively placed for blocking movement of the valve stem of the valve operator.

27. Apparatus of claim 20, wherein said means for measuring a mechanical output includes means for measuring an axial force of the valve stem in response to the imposed mechanical loads.

28. Apparatus of claim 20, wherein said means for measuring a mechanical output includes means for measuring a rotational force of the operator in response to imposition of mechanical load.

29. Method of claim 16, wherein the relating step comprises the steps of dividing a predetermined threshold value of mechanical load by the steady state factor to define a threshold motor load, and comparing the motor load measured during valve in use with the threshold motor load.

* * * * *